March 29, 1966 A. S. ESCOBOSA 3,243,585

SIGNAL TRANSLATING APPARATUS HAVING REDUNDANT SIGNAL CHANNELS

Filed May 29, 1962 3 Sheets-Sheet 1

INVENTOR.
ALFONSO S. ESCOBOSA
BY Rolf M. Pitts
ATTORNEY

INVENTOR.
ALFONSO S. ESCOBOSA
BY Rolf M. Pitts
ATTORNEY

INVENTOR.
ALFONSO S. ESCOBOSA
BY Rolf M. Pitts
ATTORNEY

United States Patent Office 3,243,585

Patented Mar. 29, 1966

3,243,585
SIGNAL TRANSLATING APPARATUS HAVING REDUNDANT SIGNAL CHANNELS

Alfonso S. Escobosa, Fullerton, Calif., assignor to North American Aviation, Inc.

Filed May 29, 1962, Ser. No. 198,481
15 Claims. (Cl. 235—184)

This invention relates to signal translating means having improved reliability, and more particularly to a signal translating device having redundant signal channels for improving reliability in both static gain and dynamic performance characteristics of such device.

The application of modern automatic control systems in the control of aircraft, missiles, and complex weapon systems has lead to the development of equipments of considerable complexity. This complexity has arisen, in part, from the aggregation of functions to be performed by such control systems, and also from the signal translation requirements for transducers and signal-shaping devices to effect signal transformation and translation. Such system complexity has resulted in decreased reliability as indicated by high rates of failure or low mean-time-between-failures.

One approach to the improvement of systems reliability has been to attempt to improve the design of each functional component in a given system. However, in a large system made up of many components, such an approach produces little improvement for several reasons. First, many components, being in a state of advanced development, do not lend themselves to significant additional improvement. Further, because of the large number of components comprising such complex systems, the improvement of only those several components which may lend themselves to substantial improvement in design does not significantly effect the overall reliability of such systems.

Another approach to the improvement of systems reliability has been the use of redundant signal channels, whereby the effect of the failure of a given channel is minimized, with regard to overall systems performance. Such redundancy technique as an approach to improved reliability has recently become attractive for another supporting reason. The development of micro-miniaturization techniques has made possible the manufacture of electronic control systems of decreased size and weight, at an attendant high development cost. This miniaturization provides the additional weight and space margin required to accommodate redundant system elements. Further, the ability to thus conveniently accommodate system redundancy provides additional justification and cause for undertaking the costs of micro-miniaturization. Hence, the additional costs of micro-miniaturization may be justified by increased reliability, rather than merely by smallness for the sake of smallness.

Prior efforts to such redundancy approach have been various and have been only partially effective. One example of such approach has been redundant means for providing a signal output equal to the sum of the output from several paralleled or redundant signal translating devices, each of which is responsive to a single common input signal. The advantage of such a scheme is that a zero output type failure of one of the redundant elements of such an arrangement does not wholly disable the device. In other words, the device continues to provide an output signal in response to an input signal. However, a disadvantage of such a summing device is that the gain or ratio of the output signal level to the input signal level is decreased or reduced by such failure. Further, where each of the plurality of elements in parallel is a closed-loop element (e.g., each element is operated in a mutually exclusive high-gain negative feedback arrangement), the effect of a failure in a feedback loop is to substantially increase the gain of the output of the associated element, resulting in an increase or error in the gain of the overall system or combination. In other words, such open-loop parallel arrangement tends to compromise system gain while preserving system operability in the face of a failure.

Another example of the use of redundancy techniques in improving system reliability has been the use of dual redundancy two-channel systems in which a system model is used as reference for failure monitoring the two redundant channels and failure switching circuits are used for switching-off a failed channel. The overall reliability of such a system may be unaffected or even reduced by such a feature, because such feature is subject to the failure of the model and the switching networks which have been added to the system.

A third example of redundancy techniques is a dual-redundancy single channel system in which the response of the system is sensed and used as a reference for failure monitoring. One of two redundant signal channels is operated, while the other serves as a stand-by or spare unit. Abnormal response of the system output relative to a preselected response limit is employed as a switching criterion (e.g., criterion for determining the existence of a failure or malfunction in the first unit) for switching off the first unit and switching-on the stand-by unit before such criterion is exceeded. Such an approach, however, does not concurrently measure both units, and relies on the operability of both the stand-by unit and the switching unit at the time of failure of the first unit. Further, the utility of such a system also assumes that the malfunction response limit criterion is tolerable, and that such response is due solely to system malfunction and not to normal system response to an abnormal input to the system.

A fourth example of redundancy techniques is a triple-redundancy three channel system or so called "majority rule" system. In such systems, at least three redundant or paralleled channels are operated concurrently, and the responses of each are compared to determine whether one of the channels has substantially deviated in performance relative to the other two, in which case the output of such channel is disengaged or suppressed to prevent malfunction of the system. In this way, only the majority signal is transmitted.

In relying on the majority response, such majority vote diversity system is ineffective in the event of concurrent failure of two of the three systems. Therefore, in requiring at least three parallel elements in order to assure a majority, such a system suffers at least a tripling in the amount of hardware in order to protect against the failure of only a single system.

Accordingly, it is a broad object of this invention to provide a system of redundancy that provides improved reliability relative to the zero signal failure of all but one of a plurality of redundant elements.

In a preferred embodiment of the concept of the invention, there is provided a combination of like signal channels in novel parallel arrangement with compensating signal paths or loops for minimizing the effects of a combination of failures of individual signal channels of the combination. A common network nodal point is employed for both output and feedback of each channel. More particularly, there is provided a signal translation device having an input and an output terminal, and comprising a plurality of signal channels each having an output and an input. The inputs of the signal channels are commonly responsive to the input to the signal translation device, and the output of each of said channels is commonly connected to the output terminal of the signal device by means of a mutually exclusive summing impedance. Each channel further comprises a mutually exclusive negative feedback element responsively connected to the common output terminal of the signal device and operatively connected to an input of such channel.

In normal operation the output signal from the signal translation device, occurring at the output terminal of the device, is substantially commonly indicative of the output from each of the plurality of like signal channels. Upon a zero signal failure of less than all of the signal channels, the remaining operative signal channels in cooperation with the feedback elements associated therewith operate to compensate for such signal channel failures in such a fashion as to minimize the resulting difference in signal output performance. In this way, the effects of the zero signal failure of a combination of signal channels is minimized. By selecting a particular degree of redundancy or number of paralleled signal channels, an arbitrary limit of reliability may be approached.

Such feedback arrangement servies to provide compensation of the overall gain of the redundant system by closed-loop adjustment of signal levels of individual operative redundant signal channels Further, where signal-shaping networks are involved, such combination of redundancy and feedback also tends to preserve the dynamics or frequency response of the system, as well as the static gain characteristics, in the event of failures. Hence, by means of the above described arrangement, the effects upon both the gain and dynamics of the signal translating device due to signal channel failures may be minimized. Accordingly, it is an object of the subject invention to provide means for minimizing the effects of concurrent signal failures to a signal translating device.

It is another object of the subject invention to provide means for minimizing the effects of concurrent signal channel failures to a plurality of redundant signal channels.

It is still another object of the subject invention to minimize the effect of concurrent signal channel failures upon the gain of a signal translating device.

It is a further object of the subject invention to minimize the effect of signal channel failures upon the dynamics of a signal-shaping device.

It is still a further object of the subject invention to minimize the effects of signal channel failures upon both the static gain and dynamics of a signal translating device.

It is yet a further object of the subject invention to provide improved redundancy for each of a plurality of serial functional elements which together comprise a single functional system.

These and other objects of the invention will become apparent from the following description taken together with the accompanying drawings in which.

In the figures, like reference characters refer to like parts.

Figure 1:
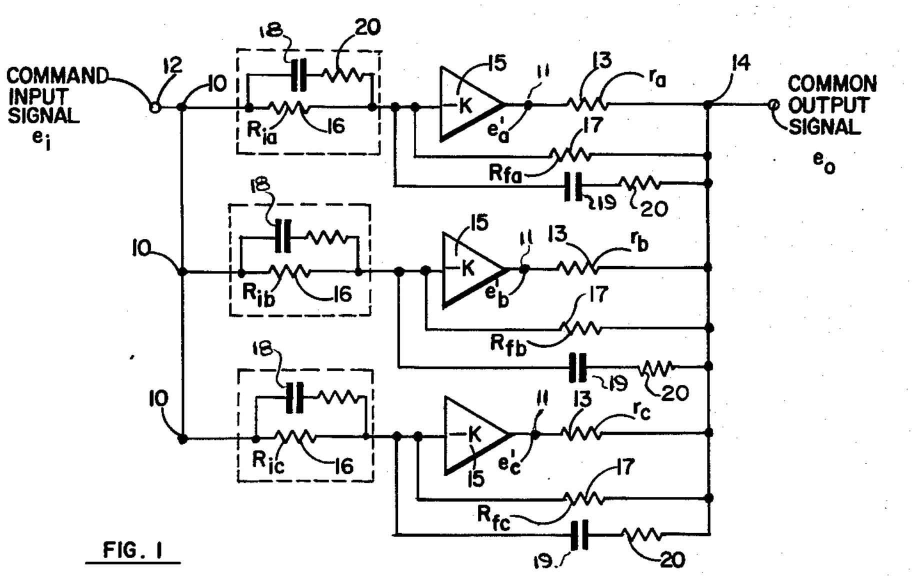
FIG. 1 is a schematic diagram of a signal translating device illustrating a concept of the invention.

Referring to FIG. 1, there is a schematic diagram of an analog signal translating device illustrating a concept of the invention. There is provided a plurality of like signal channels each having an input terminal 10 and an output terminal 11, the input terminals 10 being commonly connected to the input terminal 12 of the device. There is further provided a like number of summing resistors 13, each summing resistor interconnecting a mutually exclusive one of the channel output terminals 11 to the single common output terminal 14 of the device.

Each signal channel also comprises a signal inverter or operational summing amplifier 15 having a negative gain, $-K$. Such amplifiers may be of conventional construction and arrangement, being well known to those skilled in the analog computer art. The output of each such amplifier is connected to output terminal 11 of an associated channel, and the input such amplifier being interconnected with an associated input terminal 10 by means of an input resistor 16. Each signal channel further comprises mutually exclusive feedback means interconnecting the input of an associated one of amplifiers 15 with common output terminal 14. Such feedback means includes at least parallel feedback resistor 17. The negative feedback characteristic arises from the signal inversion or sense reversal occurring in the amplifier output due to the negative gain $-K$ of amplifier 15.

In normal operation of the above-described arrangement, the output signal appearing at terminal 14 in response to an analog input signal applied to terminal 12 of the device will be substantially proportional to the input, as may be seen from the following analytical treatment.

Writing the general nodal equation about terminal 14 (assuming the amplifiers draw no current):

$$\frac{e_o}{r_a}+\frac{e_o}{r_b}+\frac{e_o}{r_c}+\frac{e_o}{R_{f_a}}+\frac{e_o}{R_{f_b}}+\frac{e_o}{R_{f_c}}-\frac{e'_a}{r_a}-\frac{e'_b}{r_b}-\frac{e'_c}{r_c}=0 \quad (1)$$

where:

$$e'_a=-K_a\left[\frac{e_i}{R_{i_a}}+\frac{e_o}{R_{f_a}}\right] \quad (2)$$

$$e'_b=-K_b\left[\frac{e_i}{R_{i_b}}+\frac{e_o}{R_{f_b}}\right] \quad (3)$$

$$e'_c=-K_c\left[\frac{e_i}{R_{i_c}}+\frac{e_o}{R_{f_c}}\right] \quad (4)$$

Noting that nominally, like reference characters refer to like elements in FIG. 1, corresponding parameters of each channel in FIG. 1 are like valued. Therefore, Equations 1, 2, 3 and 4 may be combined, and the *a, b, c,* subscript notation dropped.

$$3\left[\frac{e_o}{r}+\frac{e_o}{R_f}\right]+3K\left[\frac{e_i}{R_i}+\frac{e_o}{R_f}\right]\frac{1}{r}=0 \quad (5)$$

It is to be appreciated that for any desired degree of redundancy or number, $n$, of redundant elements, Equation 5 would be rewritten as follows:

$$n\left[\frac{e_o}{r}+\frac{e_o}{R_f}\right]+nK\left[\frac{e_i}{R_i}+\frac{e_o}{R_f}\right]\frac{1}{r}=0 \quad (6)$$

Noting that the redundancy factor, $n$, may be eliminated (in normal operation), and solving for the normal operating transfer function $e_o/e_i$:

$$e_o\left[1+\frac{r}{R_f}+\frac{K}{R_f}\right]+e_i\frac{K}{R_i}=0 \quad (7)$$

$$e_o[R_f+r+K]+e_iK\frac{R_f}{R_i}=0 \quad (8)$$

$$\frac{e_o}{e_i}=\frac{-R_fK}{R_i(r+R_f+K)} \quad (9)$$

It is to be noted from Equation 9 that as the amplifier gain approaches an infinitely large value, the gain of the system approaches the ratio $R_f/R_i$ $$\frac{e_o}{e_i}=\frac{-R_fK}{R_i(r+R_f+K)}\approx\frac{-R_f}{R_i} \quad (10)$$

where:

$$K>>(r+R_f)$$

If one of the three amplifiers 15 in FIG. 1 suffers a zero-signal type failure (say $K_c$ of Equation 4 becomes zero), then the combination of Equations 1, 2, 3 and 4 would define a different transfer function for $e_o/e_i$. Rewriting Equation 5 to reflect such condition:

$$3\left[\frac{e_o}{r}+\frac{e_o}{R_f}\right]+2K\left[\frac{e_o}{R_i}+\frac{e_o}{R_f}\right]\frac{1}{r}=0 \quad (11)$$

$$e_o\left[3+\frac{3r}{R_f}+\frac{2K}{R_f}\right]+e_i\frac{2K}{R_i}=0 \quad (12)$$

$$e_o\left(R_f+r+\frac{2}{3}K\right)+e_i\frac{2}{3}\frac{KR_f}{R_i}=0 \quad (13)$$

$$\frac{e_o}{e_i}=\frac{-\frac{2}{3}KR_f}{R_i\left(r+R_f+\frac{2}{3}K\right)} \quad (14)$$

Equation 14, therefore represents the steady state transfer function of the signal translating device of FIG. 1 in the presence of a single amplifier zero-signal type failure. It is to be observed that an effect of such a failure is to tend to reduce the overall gain $e_o/e_i$ of the signal translating system. However, it is also to be observed that the expression of Equation 14 would reduce to that of Equation 10 as the gain of the remaining operable amplifiers approaches an infinitely larger value:

$$\frac{e_o}{e_i}=\frac{-\frac{2}{3}KR_f}{R_i\left(r+R_f+\frac{2}{3}K\right)}\approx-\frac{R_f}{R_i} \quad (15)$$

where:

$$\tfrac{2}{3}K>>(r+R_f$$

Further, it is to be noted that the ⅔ factor in Equation 14 represents a single failure in a triple redundary scheme. It is to be appreciated that Equation 14 may be rewritten to describe the overall system gain $e_o/e_i$ resulting from any given number of concurrent signal channel zero-signal failures, *m*, occurring in a system of any degree of redundancy, *n*:

$$\frac{e_o}{e_i}=\frac{-\frac{(n-m)}{n}KR_f}{R_i\left[r+R_f+\frac{(n-m)}{n}K\right]} \quad (16)$$

Hence, for the case where all signal channels demonstrate zero signal failure, the system gain is obviously zero:

$$\frac{e_o}{e_i}=\frac{-\frac{(n-m)}{n}KR_f}{R_i\left[r+R_f+\frac{(n-m)}{n}K\right]}=0 \quad (17)$$

where:

$$n-m=0$$

It is to be further noted that the effect of a limited number of system failures less than the number of channels ($m<n$), in tending to reduce the overall gain $e_o/e_i$, may be alleviated by employing a high enough gain, K, in the operable remaining amplifiers. Generalizing the expression of Equation 15:

$$\frac{e_o}{e_i}=\frac{-\frac{(n-m)}{n}KR_f}{R_i\left[r+R_f+\frac{(n-m)}{n}K\right]}\approx-\frac{R_f}{R_i} \quad (18)$$

where:

$$\frac{(n-m)}{n}K>>(r+R_f)$$

The effect of a concurrent zero signal amplifier failure in less than all of the signal channels is compensated for by the feedback action of the operative signal channels. Therefore, it is to be appreciated that the saturation level of the operative amplifiers will limit the effectiveness of a high gain loop in maintaining control authority (maximum signal output level) in response to large input signals. The output $e'_a$, for example, associated with amplifier 15 of the first signal channel of the three-channel or triple redundant system of FIG. 1 during normal operation of all three channels, may be described analytically by combining Equations 1, 2, 3 and 4 (mitting the *a, b, c,* subscript notation):

$$e'=\frac{-(r+R_f)Ke_i}{R_i(r+R_f+K)}\approx\frac{-(r+R_f)e_i}{R_i} \quad (19)$$

In the presence of a zero signal failure in amplifier 15 of a single channel, say the third channel (e.g., $e'_c=0$), then the output from either of the operative amplifiers in the first and second channels may be described as:

$$e'=\frac{-(r+R_f)Ke_i}{R_i\left(r+R_f+\frac{2}{3}K\right)}\approx\frac{-3(r+R_f)e_i}{2R_i} \quad (20)$$

In other words, the 100% loss of output, $e'_c$ in FIG. 1, is shared between the remaining signal channels whose output is each increased by 50% to provide a system output, $e_o$, of 150% or 3/2 the normal output level described in Equation 19. However, this can only be achieved for input signals, $e_i$, of a level which do not result in saturation of the operative amplifiers. The result of a system input signal level for $e_i$ which theoretically would produce an amplifier output signal level $e'$ in excess of the amplifier saturation level is an effective reduction of control authority or gain due to such signal saturation.

Similarly, in the presence of a concurrent zero signal failure in amplifiers 15 of two signal channels, say the second and third channels (e.g., $e'_b=0$, $e'_c=0$), then the output from the remaining operative amplifier 15 in the first channel may be described as:

$$e'=\frac{-(r+R_f)Ke_i}{R_i(r+R_f+\tfrac{1}{3}K')}\approx\frac{-3(r+R_f)e_i}{R_i} \quad (21)$$

In other words, the 100% loss of output $e'_b$ and $e'_c$ in FIG. 1 is borne by the remaining operative signal channel whose output is increased 200% to provide an output 300% or 3 times the normal output level described in Equation 19. Again, this result is obtained for input signal levels for $e_i$ which do not produce saturation ($e'_{max}$) of the operative amplifiers. Further, by comparison of Equations 19, 20 and 21 it is to be appreciated the level of input signal that can be handled by operative amplifiers of redundant signal channels without loss of control authority is proportional to the ratio of operative amplifiers ($n-m$) to the number of redundant channels $n$ and to the amplifier saturation level, $e'_{max}$. Rearranging and generalizing Equation 21:

$$e_i=\frac{(n-m)R_ie'_{max}}{(n)(r+R_f)} \quad (22)$$

It is to be appreciated that an amplifier may suffer a loss of gain or less than a total loss of gain, in which case it is to be noted that the device of FIG. 1 will yet tend to compensate, if not substantially overcome, such partial loss of gain in individual ones of less than all redundant signal channels.

Considering further the device of FIG. 1 as comprised of resistive coupling impedances, and omitting the other reactive coupling impedances shown, another type of failure (other than a total or partial loss of amplifier gain) is the opening of an input resistor 16. This type of failure results in a zero input signal to an associated amplifier 15. For a low-level system input (e.g., resulting in no amplifier saturation) the system gain is:

$$\frac{e_o}{e_i}=\frac{-2R_fK}{3R_i(r+R_f+K)}\approx\frac{-2R_f}{3R_i} \quad (23)$$

Such a result represents only two-thirds of the normal system gain. In other words, for low level input signals the open-circuit failure of an input resistor 16 to a give amplifier 15 results in a corresponding reduction of the system gain. However, such low-level signal case appears to be of limited practical significance.

It is to be noted that the output (say, $e'_c$) of that amplifier suffering the open-circuited input resistor is:

$$e'=\frac{2K^2e_i}{3(r+R_f+K)R_i}\approx\frac{+2Ke_i}{3R_i} \qquad (24)$$

Similarly, the output of each of the remaining amplifiers in FIG. 1 is:

$$e'=-\frac{(3r+3R_f+K)Ke_i}{(3r+3R_f+3K)R_i}\approx-\frac{Ke_i}{3R_i} \qquad (25)$$

It is to be noted that the effect of the sightest input to the device of FIG. 1 will result in an output of opposite sense at output terminal 14 (due to the effect of the operative channels). This output, when fed back to the input of the amplifier suffering the open-circuited input resistor (say the third channel) will cause such amplifier to attempt to amplify such output signal, tending to cause saturation of such amplifier. Any input level of $e_i$ greater than the one causing saturation of the amplifier having the open-circuit input resistor, is defined as a normal level input. Such an input level is defined from Equation 24 as:

$$e_i\geq\frac{3R_ie'_{max}}{2K} \qquad (26)$$

where:

$R_i$=normal input resistance of a single channel amplifier
$-K$=normal amplifer gain
$e'_{max}$=normal amplifier output saturation level.

In the case of normal levels of input signal $e_i$ (resulting in the above-described amplifier saturation) the system gain $e_o/e_i$ due to the open-circuited condition of a single one of input resistors 16 is:

$$\frac{e_o}{e_i}=\frac{R_fe'_{max.}}{(3r+3R_f+2K)e_i}-\frac{2R_fK}{(3r+3R_f+2K)R_i} \qquad (27)$$

Simplifying Equation 27:

$$\frac{e_o}{e_i}\approx\frac{R_fe'_{max.}}{2Ke_i}-\frac{R_f}{R_i} \qquad (28)$$

where:

$$2K\gg(3r+3R_f)$$

Such result is derived from the nodal expression for the currents summed at terminal 14 in FIG. 1. Recalling that the input levels of each of amplifiers 15 is at virtual ground, the current flow from output point 24 toward ground through the three feedback resistors is equal to $3e_o/R_f$. The current flow toward terminal 14 from the saturated amplifier having the open circuited input resistor is $$(-e'_{max}+e_o)/r$$

and the combined current flow from the two normally operable channels to terminal 14 is $$2(-e'-e_o)/r$$

Equating the current flow to and from terminal 14:

$$\frac{-3e_o}{R_f}=\frac{(-e'_{max.}+e_o)}{r}+\frac{2(-e'+e_o)}{r}$$

Recalling that the output voltage, $e'$, of each of the two normally operable amplifiers is a function of the sum of the input currents thereto:

$$e'=-K\left(+\frac{e_i}{R_i}-\frac{e_o}{R_f}\right)$$

Substituting such latter expression for $e'$ in the current flow equation and rearranging:

$$\frac{-3e_o}{R_f}=\frac{-e'_{max.}}{r}+\frac{e_o}{r}-2K\left(\frac{+e_i}{R_i}-\frac{e_o}{R_f}\right)\frac{1}{r}+\frac{2e_o}{r}$$

$$e_o\left(\frac{3}{R_f}+\frac{3}{r}+\frac{2K}{R_{f_r}}\right)=\frac{e'_{max.}}{r}-\frac{2Ke_i}{R_{i_r}}$$

$$e_o\frac{(3r+3R_f+2K)}{R_{f_r}}=\frac{e'_{max.}}{r}-\frac{2Ke_i}{R_{i_r}}$$

$$\frac{e_o}{e_i}=\frac{e'_{max.}R_f}{(3r+3R_f+2K)e_i}-\frac{2R_fK}{(3r+3R_f+2K)}$$

which latter expression is identical to that of Equation 27.

It is to be noted that for normal input signal levels (defined above) the first term, $$R_fe'_{max}/2Ke_i$$

of Equation 28 is relatively small, compared to the second term $$R_f/R_i$$

Hence, Equations 27 and 28 can be further simplified:

$$\frac{e_o}{e_i}\approx-\frac{R_f}{R_i} \qquad (29)$$

In expressing the system gain $e_o/e_i$ for the device of FIG. 1 in which one of the input resistors 16 is open-circuited, and where the input signal level is normal, Equation 28 is seen to be equivalent to the expression for the normal system (no failure) gain, given in Equation 18 above. Hence, the desired mode of system operation is achieved in the presence of an open-circuit condition for a single one of the input resistors 16. This phenomenon is explained by observing that the output of the amplifier having the open-circuited input resistor is $+e'_{max}$ (the saturation level), and that the output of each of the remaining two amplifiers is:

$$e'=-\frac{Ke'_{max.}}{3r+3R_f+2K}-\left(\frac{3r+3R_f}{3r+3R_f+2K}\right)\frac{Ke_i}{R_i} \qquad (30)$$

Simplifying Equation 30:

$$e'=-\frac{e'_{max.}}{2}-\frac{(3r+3R_f)}{2R_i}e_i \qquad (31)$$

where:

$$2K\gg(3r+3R_f)$$

The derivation of Equation 30 is similarly obtained as that of Equation 27. Recalling that the output voltage of either of the operative amplifiers is:

$$e'=-K\left(\frac{e_i}{R_i}-\frac{e_o}{R_f}\right)$$

as indicated above, and that the expression for the output voltage is:

$$e_o=\frac{R_fe'_{max.}}{(3r+3R_f+2K)}-\frac{2R_fK}{(3r+3R_f+2K)R_i}$$

such latter expression for $e_o$ may be substituted in the right hand member of the equation for $e'$, as follows:

$$e'=-\frac{Ke_i}{R_i}-\frac{KR_fe'_{max.}}{R_f(3r+3R_f+2K)}-\frac{2R_fK^2e_i}{R_f(3r+3R_f+2K)R_i}$$

$$e'=e_i\left[-\frac{K}{R_i}-\frac{2K^2}{(3r+3R_f+2K)R_i}\right]-\frac{Ke'_{max.}}{(3r+3R_f+2K)}$$

$$e'=-\frac{Ke_i}{R_i}\left(\frac{3r+3R_f+2K-2K}{3r+3R_f+2K}\right)-\frac{Ke'_{max.}}{(3r+3R_f+2K)}$$

$$e'=\frac{-Ke'_{max.}}{(3r+3R_f+2K)}-\frac{(3r+3R_f)Ke_i}{(3r+3R_f+2K)R_i}$$

which latter expression is identical to Equation 30.

Summarizing the effects of an open-circuit failure of one of input resistors 16, the result causes the device of FIG. 1 to exhibit two-thirds of the normal system gain for low-level inputs, and a normal gain for normal input levels. Also, for normal level inputs to the system, the amplifier having the failed input resistor will saturate and the remaining amplifiers will operate about a bias of $\frac{1}{2}e'_{max}$, the polarity of the bias being opposed to that of the saturated amplifier. Hence, the specified $e'_{max}$ for the amplifiers 15 should be twice the normally required operating range if no loss of control authority is to be tolerated. The foregoing type of analysis can be similarly applied to any number $m$ of open-circuit input resistor failures occurring in connection with a system of any degree of redundancy, $n$.

Another type of failure which may occur is the open-circuiting of a feedback resistor 17 associated with one of the amplifiers 15 in FIG. 1. Such a type of failure tends to increase the system gain $e_o/e_i$ above the normal value. The analysis of this type of failure follows the same approach as that employed for the open-circuited input resistor type of failure. For a low-level signal input to the system (e.g., $e_i$, applied to common terminal 12), the system gain $e_o/e_i$ is:

$$\frac{e_o}{e_i}=\frac{-3R_fK}{(2r+3R_f+2K)R_i}\approx\frac{-3R_f}{2R_i} \quad (32)$$

where:

$$2K>>(2r+3R_f)$$

Hence, Equation 32 indicates that for the triple redundancy device of FIG. 1, an open-circuit type failure of one of feedback resistors 17, results in a 50% system gain increase or a system gain of 150% the normal gain expression given in Equation 18 in the presence of low-level input signals.

The output $e'$ of the amplifier having the open feedback resistor $R_f$ is:

$$e'=\frac{Ke_i}{R_i} \quad (33)$$

The output of each of the remaining amplifiers is:

$$e'=-\frac{(2r+3R_f-K)}{(2r+3R_f+2K)}\frac{Ke_i}{R_i}\approx\frac{+Ke_i}{2R_i} \quad (34)$$

where:

$$K>>(2r+3R_f)$$

For normal level inputs defined as $$e_i>\left|\frac{e'_{max.}}{K}\right|$$

the system gain is:

$$\frac{e_o}{e_i}=-\frac{R_fe'_{max.}}{(2r+3R_f+2K)e_i}-\frac{2R_fK}{(2r+3R_f+2K)R_i} \quad (35)$$

Where, however, $$2K>>(2r+3R_f)$$

then Equation 35 may be simplified:

$$\frac{e_o}{e_i}=-\frac{R_fe'_{max.}}{2Ke_i}-\frac{R_f}{R_i}\approx-\frac{R_f}{R_i} \quad (36)$$

Hence, Equation 36 indicates that for the triple redundancy device of FIG. 1, an open-circuit type failure of one of feedback resistors 17 results in a system gain $e_o/e_i$ equal to the normal gain expressed in Equation 18. This phenomenon is explained by observing that the output of the amplifier having the failed feedback resistor is $e'_{max}$, and that the output of each of the remaining two amplifiers is:

$$e'=\frac{Ke'_{max.}}{2r+3R_f+2K}-\frac{(2r+3R_f)Ke_i}{(2r+3R_f+2K)R_i} \quad (37)$$

Simplifying Equation 37:

$$e'\approx\frac{e'_{max.}}{2}-\frac{(2r+3R_f)}{(2R_i)}e_i \quad (38)$$

Summarizing the effects of an open-circuit failure of one of the feedback resistors 17, such failure causes the device of FIG. 1 to exhibit three halves of the normal system gain for low level inputs, and a normal gain for normal input levels. Also, for normal level inputs to the system, the amplifier having the failed feedback resistor will saturate and the remaining amplifiers will operate about a bias of $\frac{1}{2}e'_{max}$, the polarity of the bias being opposed to that of the saturated amplifier. Hence, the $e'_{max}$ specification is the same as that discussed in connection with an input resistor failure. The foregoing type of analysis can be similarly applied to any number of open-circuit feedback resistor failures $m$ occurring in connection with a system of any degree of redundancy, $n$.

Another type of failure which may occur in a concurrent failure of an input resistor 16 and a feedback resistor 17 of FIG. 1. This type of failure may be of two subclasses of failure. (1) where the failed input resistor and failed feedback resistor are contained in a common signal channel, and (2) where the failed input resistor and failed output resistor are contained in mutually exclusive signal channels. Where the concurrent failure occurs in a common signal channel, the case analysis is the same as for the single channel zero signal type failure analysis presented in connection with Equations 17 and 18.

Where the concurrent failures occur in mutually exclusive signal channels, however, the system gain remains substantially unchanged from that for normal system operation. This is true for both low-level system inputs and normal level system inputs, as demonstrated analytically in the following equations. Under the condition of the concurrent type of failure described, the system gain for a low-level input is:

$$\frac{e_o}{e_i}=\frac{2R_fK}{(2r+3R_f+2K)R_i}\approx-\frac{R_f}{R_i} \quad (39)$$

where:

$$2K>>(2r+3R_f)$$

For normal level inputs the same gain is:

$$\frac{e_o}{e_i}=-\frac{R_fK}{(2r+3R_f+)R_i}-\frac{R_f}{R_i} \quad (40)$$

where:

$$K>>(2r+3R_f)$$

Another type of failure is an open-circuit failure in one or more (e.g., less than all) of the output summing resistors 13. However, such failures alone do not produce a system performance failure, but instead merely serve to decrease the degree of effective system redundancy.

Referring again to FIG. 1, there are provided shunt reactive impedance elements to provide signal shaping as desired. There is provided a shunt input capacitor 18 connected in parallel with each of input resistors 16. There is further provided a shunt feedback capacitor 19 connected in parallel with each of feedback resistors 17. In series with each of capacitors 18 and 19 is a series resistor 20, the purpose of which is to protect against shorting of an associated input or feedback circuit in the event of a short circuit failure of a corresponding input or feedback capacitor. The effects upon the signal-shaping characteristics of the system of FIG. 1 in the event of either a short circuit or open circuit failure of any of capacitors 18 and 19 may be analyzed similarly as the foregoing analysis of the effects of resistor failures upon the D.-C. gain characteristics of the system.

Hence, it is to be appreciated that the device of FIG. 1 provides improved means for minimizing the effects of component failures in signal translating apparatus. The principle of signal channel redundancy for increased reliability (illustrated in the amplifier network of FIG. 1) is also applicable to force-rebalance inertial sensing devices, as is illustrated in FIG. 2.

Figure 2:
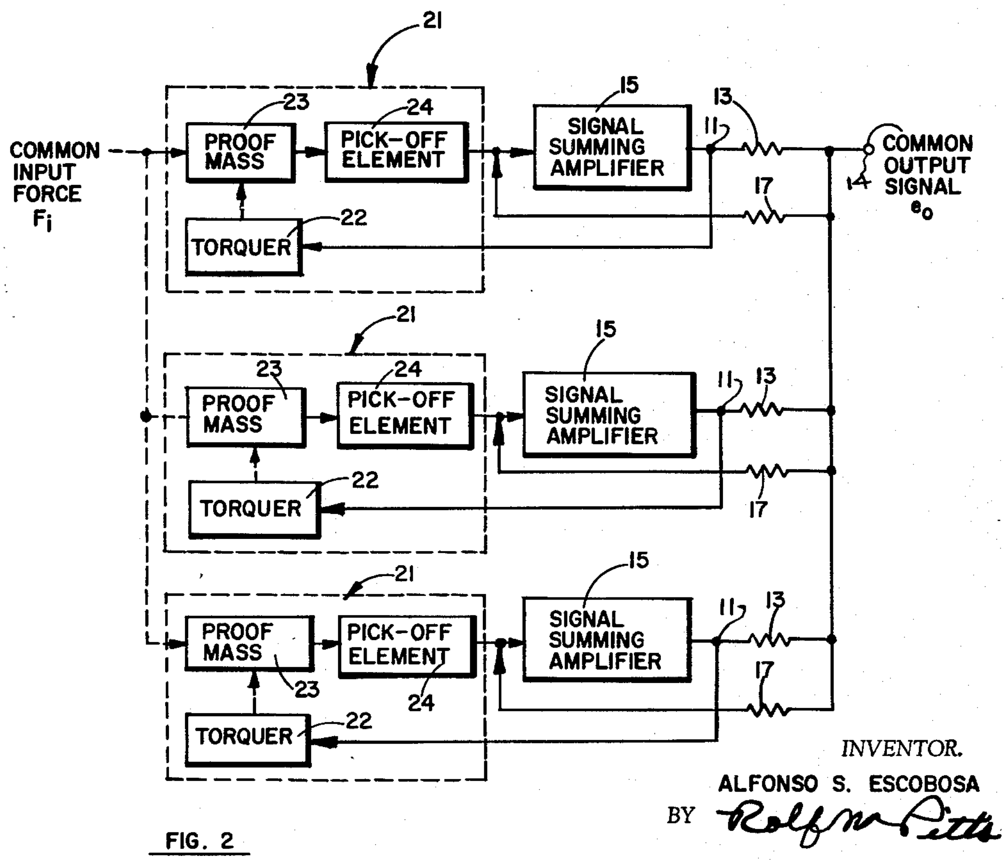
FIG. 2 is a schematic diagram partially in block form of a force-rebalance type inertial sensing device illustrating a principle of the invention.

Referring to FIG. 2, there is illustrated a schematic diagram partially in block form of a force-rebalance type inertial sensing device illustrating a principle of the invention. There is provided a plurality of like sensor channels each being responsive to a common input such as a common component of inertial acceleration, and each sensor channel having an output terminal 11. There is further provided a like number of summing resistors 13, each summing resistor interconnecting a mutually exclusive one of the channel output terminals 11 to the single common output terminal 14 of the device. While only three redundant channels are illustrated in the device of FIG. 2, it is to be understood that the concept of the device is not limited to no more than three such channels.

Each sensor channel comprises a force-rebalance type sensor such as an angular accelerometer assembly 21 having a torquing coil 22, a proof mass 23 movable relative to the rest of the accelerometer assembly, and a pickoff element 24 for providing an output signal substantially proportional to the relative displacement of the proof mass. There is further provided a phase-inverting signal amplifier 15 responsively connected to pickoff element for suitably amplifying the pickoff signal and for providing impedance isolation as required. The output of amplifier 15 is fed to output terminal 11 and to torquer 22 in such phase or sense as to oppose the displacement of the proof mass relative to a null or reference position. Such an accelerometer is described in detail, for example, in U.S. patent application Serial No. 858,523, filed December 9, 1959 by Doyle E. Wilcox et al., assignor to North American Aviation, Inc., assignee of the subject invention. The plurality of sensors are commonly oriented such that the sensitive axis of each are mutually parallel.

Each sensor channel further comprises a mutually exclusive negative feedback impedance 17 interconnecting that input of an associated one of amplifiers 15 with common output terminal 14. The negative feedback characteristic arises from the signal inversion or sense reversal occurring in the amplifier output relative to the input, similar to the feedback effect explained in connection with FIG. 1.

In normal operation of the above described arrangement, the signal output $e_0$ appearing at common output terminal 14 will be substantially proportional to the external acceleration component commonly acting along the mutually parallel sensitive axes of proof masses 23, analogous to the normal operation described for the device of FIG. 1.

In the event of a zero-signal failure of any of amplifiers 15, the operation of the device of FIG. 2 may be analogized to that described for the device of FIG. 1 for a similar failure.

In the event of a zero-signal failure of any of the accelerometers 21, the operation of the device of FIG. 2 may be analogized to the failure of an input impedance associated with any of the amplifiers of the device illustrated in FIG. 1.

The effect of the failure of any of feedback resistors 17 in FIG. 2 may be analyzed similarly as a like failure occurring in the device of FIG. 1. Further, the concurrent zero-signal failure of an accelerometer 21 concurrent with the failure of a feedback resistor 17 in FIG. 1 is analogous to the concurrent failure of an input resistor 16 and a feedback resistor 17 in the device illustrated in FIG. 1. Such analogy includes, for example, the distinction between two concurrent failures occurring in a common channel, and two concurrent failures each occurring in a mutually exclusive channel.

In the event of a zero-signal failure of torquer 22 of any of accelerometers 21, the output of an associated amplifier would saturate in response to normal level acceleration inputs to sensor 21. As a result, the other two of amplifiers 15 would each develop a signal bias of a sense opposed to the saturated output of the saturated amplifier, and having magnitude similar to that described in Equation 36 in connection with the saturation of one of amplifiers 15 in FIG. 1.

The failure of any of the summing resistors 13 in the device of FIG. 2 may be treated similarly as a like failure occurring in the device of FIG. 1, in that such failure does not effect the operativeness of the remaining device, but only reduces the degree of redundancy effectively remaining.

Hence, it is to be appreciated that the redundant combination sensor device of FIG. 2 provides novel sensing means having improved reliability.

The highly reliable redundant arrangement of force-rebalance type inertial sensor of FIG. 2 describes a combination of multiple-loop signal channels, one loop of each channel being formed by feedback resistor 17, and another loop being formed by torquer 22. An alternate embodiment of such a highly reliable redundant combination of multiple loop signal channels is described in FIG. 3.

Figure 3:
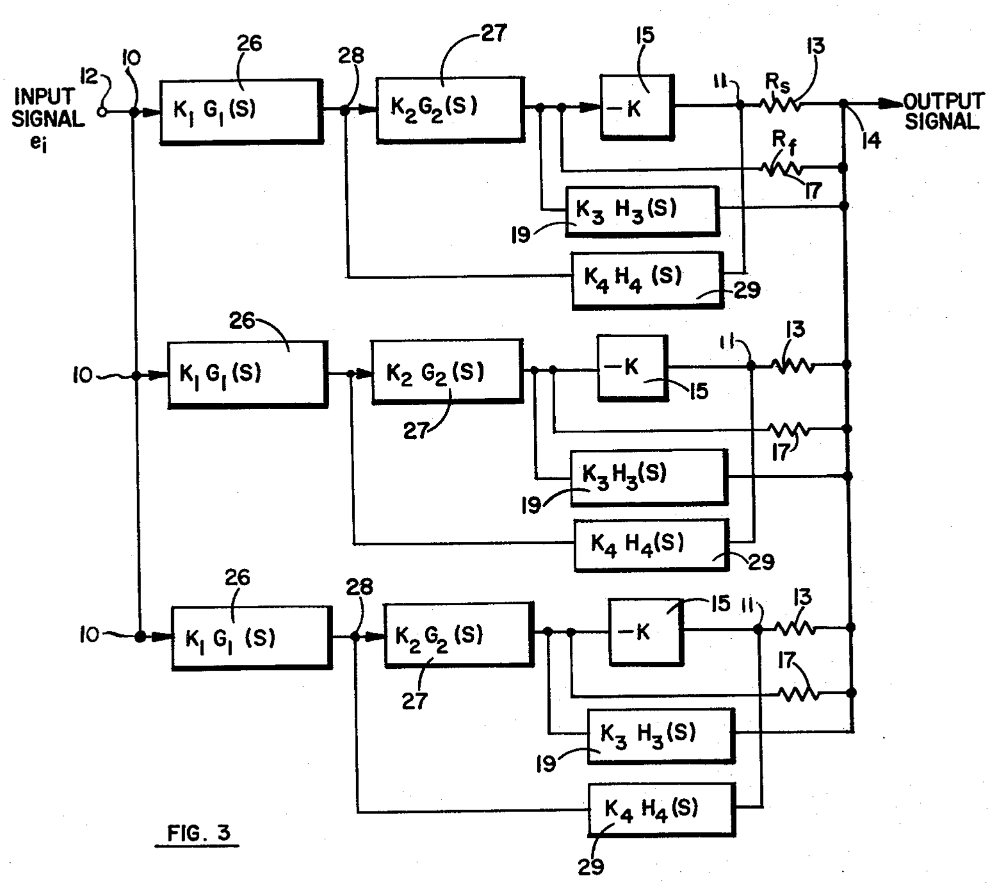
FIG. 3 is a schematic diagram partially in block form of an alternate embodiment of the invention.

Referring to FIG. 3, there is illustrated an alternate embodiment of the multiple loop device illustrated in FIG. 2. There is provided a common input terminal 12, a common output terminal 14, and a plurality of like signal channels each channel having an input terminal 10 and an output terminal 11, the input terminals 11 being commonly connected to input terminal 12 of the device. Each channel further comprises a wideband inverter-amplifier 15, output summing resistor 13, feedback resistor 17 and feedback reactive element 19, all constructed and arranged similarly as like referred elements of FIGS. 1 and 2.

There is further provided in each channel a first and second series input impedance 26 and 27 connected in series circuit between an associated input terminal 12 and an input of an associated amplifier 15. One terminal of first impedance 26 is responsively connective to said input terminal 12, the second series impedance 27 being connected between a second terminal 28 of impedance 26 and the input to said amplifier 15. There is further provided in each channel a second negative feedback impedance 29 interconnecting channel output terminal 11 and terminal 28.

Where the device of FIG. 3 is intended to provide signal shaping as well as signal translation, the impedance 26, 27 and 29 may be comprised of reactive elements or of impedances including reactive components. The combination of such reactive elements and the parametric relationships of the values therefor to achive desired signal shaping or a desired complex transfer function, $e_0/e_i$, may be effected by means well-known in the analog computer art.

In normal operation, the device of FIG. 3 functions similarly as the device of FIG. 2 to provide an output-input signal relationship equivalent to the transfer function of any one of the fully operable redundant signal channels. In the event of any combination of component failures, the response of the device may be analyzed similarly as the devices of FIGS. 1 and 2. Hence, it is to be appreciated that the device of FIG. 3 provides reliable means for processing a signal.

Figure 4:
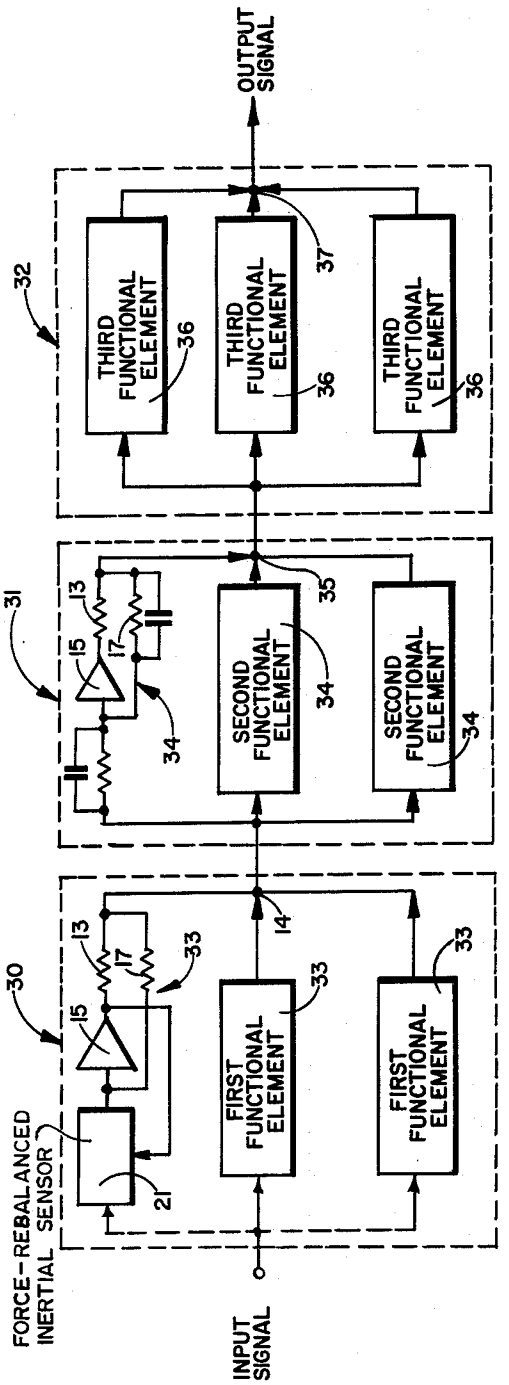
FIG. 4 is a functional block diagram of a plurality of serial functional elements which together comprise a single functional system illustrating the application of the concept of the invention.

The reliable serial processing of a signal may be accomplished by means of a tandem arrangement of the serial signal processing devices, each employing the concept of the invention, as illustrated in FIG. 4.

Referring to FIG. 4, there is illustrated a functional block diagram of a plurality of serial functional elements which together comprise a single functional system employing the concept of the invention.

There is provided a first, second and third serial functional combination 30, 31 and 32 operatively arranged in tandem, the first combination 30 being responsively connected to an input signal, second combination 31 being responsively connected to first combination 30, and third combination 32 responsively connected to the second combination 31 to provide an output signal. Such a serial arrangement of three functional combinations might occur in a signal translating device wherein several stages of amplification and signal shaping might be required, or where monopulse microwave signals are required to be (1) translated to IF signals, (2) amplified by IF amplifier devices, and then (3) phase-detected and shaped as D.-C. analog signals.

By employing the redundancy principles of the invention in connection with each functional element of a serial multiple function or tandem arrangement of several functions, the reliability of such tandem structure is significantly enhanced in that the probability is lessened that a specific functional element failure will disable the function itself, and hence disable the tandem arrangement which incorporates such function.

Hence, such first functional combination 30 is comprised of a plurality of first functional elements 33 responsive to a common input. Each of elements 33 are similarly constructed and comprise an output summing resistor for summing the element output at a common output terminal 14, and a feedback means for responsively connecting an input of such element to common output terminal 14. In a flight control system, for example, such combination 30 of functional elements might be comprised of the redundant sensor combination illustrated in FIG. 2, including force rebalanced inertial sensor 21.

The second functional combination 31 is comprised of a plurality of second functional elements 34, responsively connected to the common output terminal 14 of first functional combination 30. Each of elements 34 comprise an output summing resistor 13 for summing the element output at a common output terminal 35, and a feedback means responsively connecting an input of such element to common output terminal 35. In an exemplary flight control system, such combination 31 might be comprised of the redundant signal-shaping combination illustrated in FIG. 1 to provide equalization and flight control stabilization by means of shaped sensor signals.

The third functional combination 32 is comprised of a plurality of third functional elements 36 responsively connected to common terminal 35 and similarly arranged as elements 34 to provide an output signal at a common output terminal 37. In the exemplary flight control system discusssed above, functional elements 36 may be comprised of power amplifiers arranged in the manner of FIG. 1 for employing equalized sensor signals to drive an aircraft control surface actuator.

Hence, it is to be appreciated that the device of FIG. 4 provides highly reliable means for sensing aircraft motion, performing signal-shaping of signals indicative of aircraft motion, and controlling an aircraft by means of such shaped signals indicative of aircraft motion.

While only three serial functions have been shown in tandem arrangement, it is to be appreciated that the principle illustrated in FIG. 1 is not limited to three serial functions, but may be applied to any number of serial functions. Further, while only three redundant elements have been illustrated for each of functional combinations 30, 31 and 32 of FIG. 4, it is understood that such number is exemplary only, and that any degree of redundancy may be employed.

Accordingly, it will be seen that the device of this invention provides novel and effective means for improving the reliability of signal translating apparatus.

Although the invention has been described and illustrated in detail, it is clearly understood that the same is by way of illustration only and is not to be taken by way of limitation the spirit and scope of this invention being limited only by the terms of the appended claims.

I claim:

1. A signal translation device having an input and an output terminal comprising: a plurality of signal channels, each comprising an amplifier having an output and an input, the inputs of said amplifiers being commonly connected responsive to said input of said device, the output of said amplifiers being commonly connected to said output terminal of said device; each said channel further comprising a negative feedback element continuously connected to said output terminal of said device and operatively connected to provide an input to its respective amplifier.

2. A signal translation device having an input and an output terminal comprising: a plurality of signal channels, each comprising an amplifier having an output and an input, the inputs of said amplifiers being commonly responsive to said input to said device, the output of each said amplifier being commonly connected to said output terminal of said device by means of a summing resistor, each said channel further comprising a negative feedback element continuously connected to said output terminal of said device and operatively connected to an input of said amplifier in each channel.

3. The device of claim 2 in which each said channel is further comprised of a force-rebalance type inertial sensor subject to an acceleration input and having a sensitive axis and including a proof mass adapted for motion relative to said axis, a torquer in cooperative relationship with said proof mass for providing control of said proof mass, and a pickoff element for providing input signals to said amplifier indacative of the relative displacement of said proof mass from a reference position, the sensitive axis of each said accelerometer being mutually parallel, said torque being responsive to said output of said amplifier for restraining motion of said proof mass relative to said reference position.

4. A signal translation device having an output terminal and an input terminal, comprising: a plurality of like signal channels, each channel comprising an amplifier having an output and an input, the inputs of said amplifiers being commonly connected to said input terminal of said device; a like number of summing resistors as signal channels, each said summing resistor interconnecting the output of a mutually exclusive one of said amplifiers and said output terminal of said device; each said channel further comprising negative feedback means responsively connected to said output terminal of said device and operatively connected to an input of said amplifiers, said feedback means continuing to provide input to each of said amplifiers during a failure of less than all said signal channels.

5. A signal translation device having an output terminal and an input terminal, comprising: a plurality of like inverter amplifiers, each amplifier having an output and an input, the inputs of each of said amplifiers being commonly connected to said input terminal of said device, an input resistor being interposed between said input terminal and the input to said amplifier, and a feedback resistor responsively connected to said output terminal of said device and operatively connected to an input of said amplifier, said feedback resistor providing feedback continuously.

6. The device of claim 5 in which the following parametric relationship exists:

$$K \geqq n(r+R_f)$$

where:

$K$ is the gain of each of the amplifiers
$n$ is the number of the plurality of amplifiers
$r$ is the resistance of each of the input resistors
$R_f$ is the resistance of each of the feedback resistors.

7. The device of claim 5 in which reactive impedance elements are connected in circuit with said input resistors and said feedback resistors to provide signal shaping.

8. The device of claim 7 in which the following parametric relationship exists:

$$K \geqq n(z+Z_f)$$

where:

$K$ is the gain of each of the amplifiers
$n$ is the number of the plurality of amplifiers $z$ is the impedance of each of the input impedances $Z_f$ is the impedance of each of the feedback impedances.

9. A signal shaping device having an input and an output terminal comprising a plurality of like signal shaping channels each having an input and an output, the inputs of said channels being commonly connected to the input of said device; each said channel comprising: a first signal shaping element responsively connected to the input to said channel, a gain element having an input responsively connected to said first signal shaping element for providing an output of opposite sense to that of the input to said gain element, a summing resistor interconnecting an output of said gain element and said output terminal of said device, and a feedback resistor interconnecting the output terminal of said device and the input of said gain element; and second signal shaping means responsively connected to the output of said gain element and operatively connected to the input of said first signal shaping element to provide negative feedback thereto.

10. The device of claim 9 in which said first and second signal shaping element comprises a force-rebalance type inertial sensor having a sensitive axis and including a proof mass adapted for motion relative to said axis, a torquer in cooperative relationship with said proof mass for providing control of said proof mass, and a pickoff element for providing signals indicative of the relative displacement of said proof mass from a reference position, the sensitive axis of said said accelerometer being mutually parallel, said gain element being responsive to said signals, and said torquer being responsively connected to said gain element for restraining motion of said proof mass relative to said reference position.

11. A signal shaping device having an input terminal and an output terminal comprising a plurality of like signal shaping channels each having an input and an output, the inputs of said channels being commonly connected to the input terminal of said device; each said channel comprising: a first signal shaping element responsively connected to the input to said channel, a gain element having an input responsively connected to said first signal shaping element for providing an output of opposite sense to that of the input to said gain element, a summing resistor interconnecting an output of said gain element and said output terminal of said device, a feedback resistor interconnecting the output terminal of said device and the input of said gain element, and signal shaping means responsively connected to the output terminal of said device and operatively connected to an input of said gain element to provide negative feedback thereto.

12. A signal shaping device having an input terminal and an output terminal comprising a plurality of signal shaping channels each having an input and an output, the inputs of said channels being commonly connected to the input terminal of said device; each said channel comprising: a linear gain element having an input responsively connected to said input terminal for providing an output of opposite sense to that of the input to said gain element, an input impedance interposed in circuit between said input terminal and the input to said gain element, a summing resistor interconnecting an output of said gain element and said output terminal of said device, and a feedback impedance continuously interconnecting the output terminal of said device and the input of said gain element.

13. A signal shaping device having an input terminal and an output terminal comprising a plurality of like signal shaping channels each having an input and an output, the inputs of said channels being commonly connected to the input terminal of said device; each said channel comprising: a first signal shaping element responsively connected to the input to said channel, a gain element having an input responsively connected to said first signal shaping element for providing an output of opposite sense to that of the input to said gain element, a summing resistor interconnecting an output of said gain element and said output terminal of said device, a feedback resistor interconnecting the output terminal of said device and the input of said gain element, signal shaping means responsively connected to the output of said gain element and operatively connected to the input of said first signal shaping element to provide negative feedback thereto, and signal shaping means responsively connected to the output terminal of said device and operatively connected to an input of said gain element to provide negative feedback thereto.

14. Signal translating means comprising a plurality of like signal translating stages operatively connected in tandem, each stage having an input and output terminal and comprising: a plurality of signal channels, the inputs of the channels of each stage being commonly connected to the input terminal of said stage, the outputs of said channels being commonly connected to the output terminal of said stage, each said channel further comprising a negative feedback element responsively connected to the output terminal of an associated stage and operatively connected to an input of said channel.

15. Signal translating means comprising a plurality of like signal translating stages operatively connected in tandem, each stage having an input and output and comprising a plurality of signal channels, the inputs of the channels of each stage being commonly responsive to the input of said stage, the output of each of said channels being commonly connected to the output terminal of said stage by means of a summing resistor, each said channel further comprising a negative feedback element responsively connected to the output terminal of an associated stage and operatively connected to an input of said channel.

References Cited by the Examiner

UNITED STATES PATENTS

| | | | |
|---|---|---|---|
| 2,786,629 | 3/1957 | Piety | 235—184 |
| 3,156,855 | 11/1964 | Righton et al. | 318—29 X |

MALCOLM A. MORRISON, *Primary Examiner.*

K. W. DOBYNS, I. KESCHNER, *Assistant Examiners.*

UNITED STATES PATENT OFFICE

CERTIFICATE OF CORRECTION

Patent No. 3,243,585 March 29, 1966

Alfonso S. Escobosa

It is hereby certified that error appears in the above numbered patent requiring correction and that the said Letters Patent should read as corrected below.

Column 5, line 7, the Equation should appear as shown below instead of as in the patent:

$$3\left[\frac{e_o}{r}+\frac{e_o}{R_f}\right]+2K\left[\frac{e_i}{R_i}+\frac{e_o}{R_f}\right]\frac{1}{r}=0$$

line 36, for "$2/3K \gg (r+R_f$" read -- $2/3K \gg (r+R_f)$ --; column 7, line 54, for "24" read -- 14 --; line 56, for "$3e_o/R_f$" read -- $\frac{-3e_o}{R_f}$ --; column 10, line 42, the Equation should appear as shown below instead of as in the patent:

$$\frac{e_o}{e_i}=\frac{R_fK}{(2r+3R_f+K)R_i}-\frac{R_f}{R_i}$$

column 13, line 75, strike out "connected"; column 14, line 17, after "each" insert -- said --; line 28, for "torque" read -- torquer --; column 15, line 29, strike out "said", first occurrence, and insert instead -- each --.

Signed and sealed this 12th day of September 1967.

(SEAL)
Attest:

ERNEST W. SWIDER
Attesting Officer

EDWARD J. BRENNER
Commissioner of Patents